US007845524B2

(12) United States Patent
Evans et al.

(10) Patent No.: US 7,845,524 B2
(45) Date of Patent: Dec. 7, 2010

(54) APPARATUS AND METHOD OF DISPENSING FLUID

(75) Inventors: Christopher T. Evans, Long Valley, NJ (US); Christopher Gieda, Long Valley, NJ (US); Benjamin Mizrahi, Concord, MA (US); Charles W. Sears, Boxford, MA (US); Paul Bertram, Franklin, MA (US); David J. Schultz, Northborough, MA (US)

(73) Assignee: Union Street Brand Packaging LLC, Northborough, MA (US)

( * ) Notice: Subject to any disclaimer, the term of this patent is extended or adjusted under 35 U.S.C. 154(b) by 1168 days.

(21) Appl. No.: 11/199,587

(22) Filed: Aug. 8, 2005

(65) Prior Publication Data

US 2006/0091153 A1    May 4, 2006

Related U.S. Application Data

(60) Provisional application No. 60/623,867, filed on Nov. 2, 2004.

(51) Int. Cl.
*G01F 11/26* (2006.01)
(52) U.S. Cl. .............................. 222/454; 222/1; 222/71; 222/109; 222/158; 222/442; 222/481; 222/564; 222/567; 222/568
(58) Field of Classification Search .............. 222/424.5, 222/424, 442, 454, 455–457, 478–481, 547, 222/564, 157–158, 108–109, 39–42, 47, 222/71, 566, 568, 24, 567, 1
See application file for complete search history.

(56) References Cited

U.S. PATENT DOCUMENTS

| 1,957,962 | A | * | 5/1934 | Hyatt | 222/440 |
| 2,507,362 | A | * | 5/1950 | Bernhard | 222/424.5 |
| 2,883,086 | A | * | 4/1959 | Davison et al. | 222/67 |
| 3,181,729 | A | * | 5/1965 | Milonas et al. | 222/36 |
| 3,235,143 | A | * | 2/1966 | Goodrich | 222/454 |
| 3,288,335 | A | * | 11/1966 | Heinz et al. | 222/455 |

(Continued)

FOREIGN PATENT DOCUMENTS

DE          28 51 449          5/1979

(Continued)

OTHER PUBLICATIONS

*The International Search Report and the Written Opinion of the International Searching Authority*, International Searching Authority, Aug. 8, 2005, 13 pages.

(Continued)

*Primary Examiner*—Frederick C. Nicolas
(74) *Attorney, Agent, or Firm*—Sunstein Kann Murphy & Timbers LLP (57) ABSTRACT

An apparatus for dispensing a flowable substance (e.g., a fluid) has a first housing with an indicating apparatus and a pour chamber. The indicating apparatus may have an indicating chamber with an indicating inlet for receiving fluid. The indicating apparatus also has indicia identifying amounts of fluid flowing through the pour chamber. The pour chamber has a pour inlet for receiving fluid, and an outlet in fluid communication with the pour inlet. To provide a definite separation, the first housing additionally has a wall between the indicating chamber and the pour chamber.

38 Claims, 10 Drawing Sheets

U.S. PATENT DOCUMENTS

| | | | | |
|---|---|---|---|---|
| 4,151,934 | A | * | 5/1979 | Saeki .......................... 222/437 |
| 4,183,450 | A | * | 1/1980 | Downing et al. ............ 222/455 |
| 4,436,223 | A | * | 3/1984 | Wilson ......................... 222/36 |
| 4,666,065 | A | | 5/1987 | Ohren ......................... 222/109 |
| 4,893,732 | A | * | 1/1990 | Jennings ..................... 222/109 |
| 4,941,519 | A | * | 7/1990 | Sestak et al. .................. 141/22 |
| 5,044,527 | A | | 9/1991 | Hickerson ................... 222/451 |
| 5,054,660 | A | * | 10/1991 | Sherman et al. ............. 222/454 |
| 5,129,561 | A | * | 7/1992 | Drobish ...................... 222/455 |
| 5,143,261 | A | * | 9/1992 | Drobish ...................... 222/129 |
| 5,186,367 | A | | 2/1993 | Hickerson ................... 222/207 |
| 5,292,039 | A | * | 3/1994 | Neofitou ..................... 222/424 |
| 5,667,106 | A | * | 9/1997 | Robbins, III ................ 222/158 |
| 6,068,165 | A | * | 5/2000 | Minihane et al. ............ 222/454 |
| 6,276,572 | B1 | | 8/2001 | Evans ......................... 222/476 |
| 6,330,960 | B1 | * | 12/2001 | Faughey et al. ............. 222/205 |
| 6,343,723 | B1 | | 2/2002 | Hickerson ................... 222/442 |

FOREIGN PATENT DOCUMENTS

| | | |
|---|---|---|
| EP | 0 358 391 | 3/1990 |
| GB | 1160472 | 8/1969 |
| WO | WO 01/79791 | 10/2001 |

OTHER PUBLICATIONS

U.S. Appl. No. 11/199,578 Office Action, Apr. 1, 2009, 25 pages.

* cited by examiner

*FIG. 8B*

# APPARATUS AND METHOD OF DISPENSING FLUID

PRIORITY

This patent application claims priority from provisional U.S. patent application No. 60/623,867, filed Nov. 2, 2004, entitled, "PROPORTIONAL FILL DISPENSER," and naming Christopher T. Evans, Christopher Gieda, Charles W. Sears, Paul Bertram, David J. Schultz, and Benjamin Mizrahi as inventors, the disclosure of which is incorporated herein, in its entirety, by reference.

RELATED APPLICATIONS

This patent application is related to co-pending U.S. patent application Ser. No. 11/199,578, filed Aug. 8, 2005, and entitled, "APPARATUS AND METHOD OF DISPENSING FLUID," the disclosure of which is incorporated herein, in its entirety, by reference.

FIELD OF THE INVENTION

The invention generally relates to fluid and other dispensers and, more particularly, the invention relates to determining volumes of fluid and other materials dispensed from fluid dispensers.

BACKGROUND OF THE INVENTION

Fluids often are sold to retail consumers in containers having removable lids. For example, liquid laundry detergent typically is packaged in a container having a removable cap. Accordingly, when washing a load of laundry, a person may remove the cap from the container and pour a measured amount of detergent into their washing machine.

There are a number ways of measuring the amount of detergent to use in a load of laundry. Among others, one method involves pouring the detergent into a graduated measuring cup. Although it is simple to do, this method often leaves some detergent in the measuring cup. As a result, this method both wastes some detergent and causes inaccurate amounts of detergent to be added to the washing machine. In addition, soiling an additional component (i.e., the measuring cup) further complicates to the overall laundering process.

The art has responded to the problem of requiring separate measuring cups by adding graduations directly to the laundry detergent caps themselves. The caps thus effectively become graduated measuring cups. Despite the benefit of eliminating an extra component, however, this solution still suffers from many of the same problems that arise when using a separate graduated measuring cup. For example, the cap still may have residual amounts of detergent left in it after use, consequently causing both the above noted waste and inaccuracy problems. In fact, this solution has an additional problem; namely, when re-attaching the cap to the container, residual detergent left in the cap often spills onto the outside surface of the container or on other nearby surfaces (e.g., on top of a working surface or on the base). Accordingly, although this solution eliminates an additional component, it adds an additional complication and still suffers from many of the same problems.

In fact, this same problem is pervasive across a number of other consumer and commercial products and thus, is not limited to liquid laundry detergent, which is discussed above by example only.

SUMMARY OF THE INVENTION

In accordance with one aspect of the invention, an apparatus for dispensing a flowable substance (e.g., a fluid) has a first housing with an indicating apparatus and a pour chamber. In illustrative embodiments, the indicating apparatus includes an indicating chamber with an indicating inlet for receiving fluid. The indicating apparatus also has indicia identifying amounts of fluid flowing through the pour chamber. The pour chamber has a pour inlet for receiving fluid, and an outlet in fluid communication with the pour inlet. To provide a definite separation, the first housing additionally has a wall between the indicating chamber and the pour chamber.

In some embodiments, the indicia identifies amounts of fluid flowing through the outlet. Moreover, the indicating chamber may include a substantially translucent or transparent wall having graduations that form at least part of the indicia. The apparatus also may have a second housing for containing fluid, where the first housing is removably couplable with the second housing. For example, the first housing and second housing may be couplable by means of a threaded connection.

The apparatus may have a number of other components, including one or more of 1) a flange extending about at least a portion of one or both the pour inlet and the indicating inlet, 2) a fluid guide extending inwardly of the pour inlet relative to the first housing, and 3) a fluid redirector between the pour inlet and an outlet chamber that extends to the outlet of the pour chamber. In addition, the first housing may be at least partially formed from a hydrophobic material having a vent formed therethrough. The vent illustratively may be formed in one of the indicating chamber and the pour chamber. In some embodiments, the indicating chamber is closed to the exterior of the first housing.

In accordance with another aspect of the invention, a spout has a pour chamber with a pour inlet and a pour outlet, and an indicating chamber having an indicating inlet. The indicating chamber is closed to the exterior of the spout, while the indicating chamber has a substantially transparent or translucent wall with visual indicia.

In some embodiments, the pour inlet and the indicating inlet open to a common volume.

In accordance with another aspect of the invention, a method of producing an apparatus for dispensing fluid forms 1) a spout having a indicating chamber with an indicating inlet for receiving fluid, and 2) a pour chamber within the spout. The pour chamber has a pour inlet for receiving fluid and a pour outlet in fluid communication with both the pour inlet and the exterior of the spout. The method also determines an approximate rate that the indicating chamber fills as a function of the rate that fluid flows from the pour outlet. Indicia then is added to the indicating chamber to identify amounts of fluid flowing from the pour outlet.

In accordance with another aspect of the invention, a method of pouring a fluid from a container having a spout with a fluid outlet first tilts the container to at least one angle that causes fluid to enter the spout. Consequently, the fluid exits the spout through the fluid outlet. The method samples a portion of the fluid entering the spout. The portion of fluid being sampled has a volume that is related to the volume of fluid passing through the fluid outlet. Finally, the method causes the portion of fluid that was sampled to produce a visual indication of the approximate volume of fluid passing through the fluid outlet.

In some embodiments, the spout or portion of the container includes a plurality of fluid ports for receiving fluid contained by the container. The plurality of ports are in an area of the spout or portion of the container. In that case, the method may partially obstruct fluid flow around at least a portion of the fluid ports to concentrate fluid to a portion of the area around the ports after tilting. In addition or alternatively, the method may partially obstruct fluid flow through at least one of the ports.

In accordance with another aspect of the invention, a spout has a housing forming an inlet, an outlet, and a channel between the inlet and the outlet. The housing has a housing volume between the inlet and the outlet. The spout also has indicia adapted to show the approximate volume of fluid that passes through the outlet in real time. The indicia includes indicia identifying at least one volume that is greater than the housing volume between the inlet and the outlet.

BRIEF DESCRIPTION OF THE DRAWINGS

The foregoing advantages of the invention will be appreciated more fully from the following further description thereof with reference to the accompanying drawings wherein.

DESCRIPTION OF ILLUSTRATIVE EMBODIMENTS

In illustrative embodiments, a fluid dispensing spout identifies, in real time, the approximate cumulative amount of fluid passing through it during a single pour. For example, if it is part of a laundry detergent container, the spout may identify the approximate amount of detergent poured into a washing machine at a given time. Accordingly, a user does not need to use a measuring cup or other apparatus to ensure that the proper amount of detergent has been dispensed. To that end, the spout may be considered to sample a portion of fluid entering it, and identify substantially the total volume of fluid passing through its outlet as a function of the sampled fluid. Details of various embodiments are discussed below.

Figure 1:
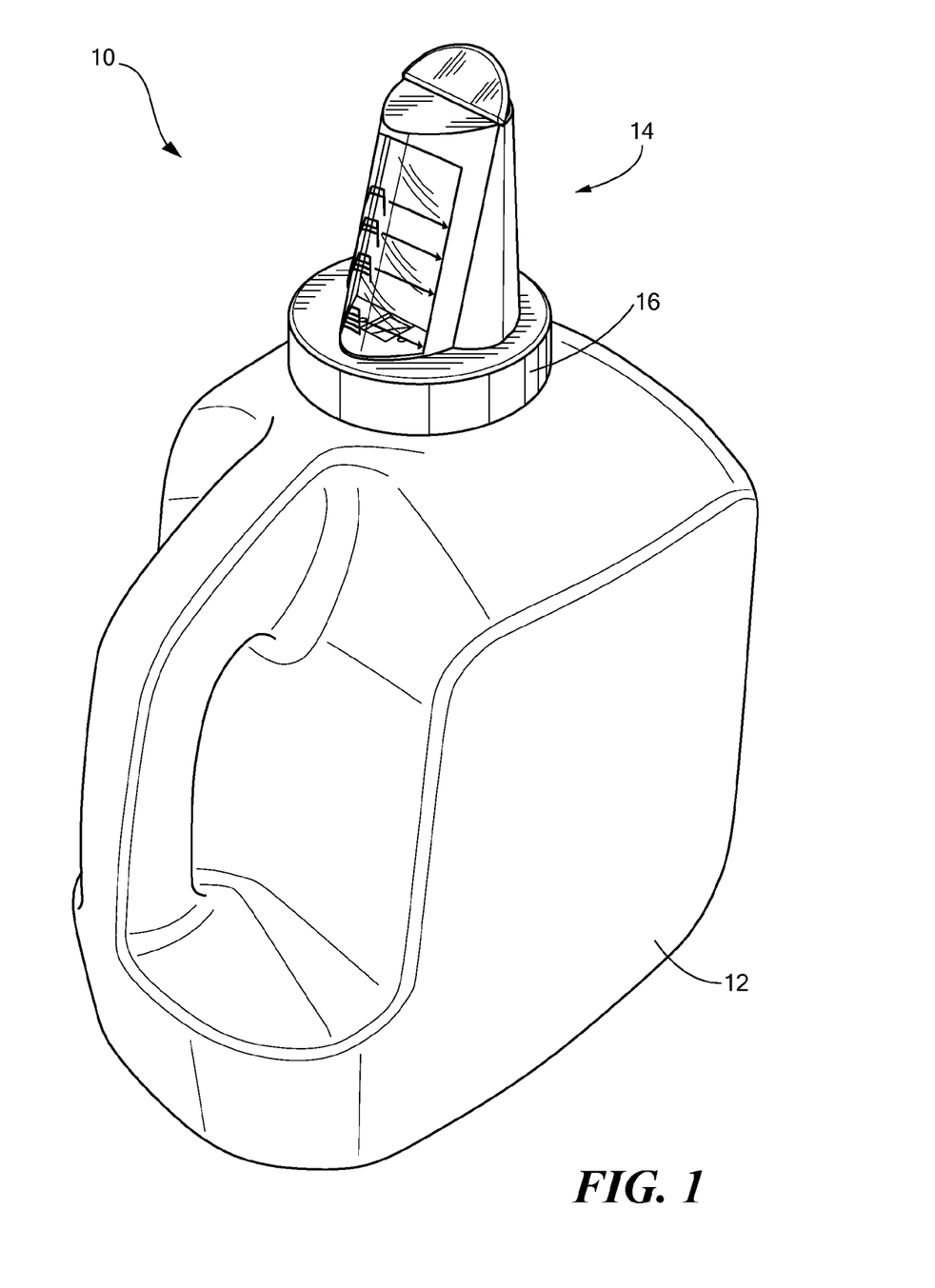
FIG. 1 schematically shows a perspective view of a fluid dispensing system incorporating illustrative embodiments of the invention.

FIG. 1 schematically shows a perspective view of a fluid dispensing system 10 incorporating illustrative embodiments of the invention. More specifically, the fluid dispensing system 10 shown in FIG. 1 includes a laundry detergent container 12 for containing laundry detergent, and a spout 14 that dynamically identifies, in real time, the cumulative amount of fluid passing through it during a single pour.

In a manner similar to conventional laundry detergent containers, the container 12 may be formed from injection molded or blow-molded plastic and have an integrated handle to facilitate use. Moreover, the spout 14 may connect to the container 12 in a wide variety of ways. For example, the spout 14 may be integrated into the neck 16 of the container 12, or adhered to the container 12 by an adhesive or conventional ultrasonic welding process.

Alternatively, the spout 14 may be removably connected to the container 12. Among other ways, the spout 14 may have threads 18 (see FIG. 2) that screw into a mating portion of the container 12. Of course, those skilled in the art should understand that a variety of conventional means may be used to removably connect the spout 14 to the container 12. In addition, although shown at the top of the container 12, the spout 14 may connect with the container 12 at any other reasonable location. For example, the spout 14 may be connected to the side of the container 12, or even to what appears to be the bottom of the container 12 (e.g., via a specially molded container 12 that permits the nozzle to be mounted in such a manner). Valving devices (not shown) also may be used to more carefully control fluid flow.

It should be noted that discussion of a laundry detergent container 12, laundry detergent, and a laundry detergent system is for illustrative purposes only and not intended to limit the scope of all embodiments of the invention. In fact, various embodiments can be implemented with a wide variety of containers containing many different types of fluids. Moreover, discussion of liquids, such as liquid laundry detergent, also is for illustrative purposes and not intended to limit the scope of all embodiments of the invention. For example, some embodiments may dynamically measure volumes of motor oil flowing through the spout 14. In fact, fluids flowing through the spout 14 may include liquids, such as liquid laundry detergent, or powders, such as laundry detergent or bleach in powder form.

Figure 2:
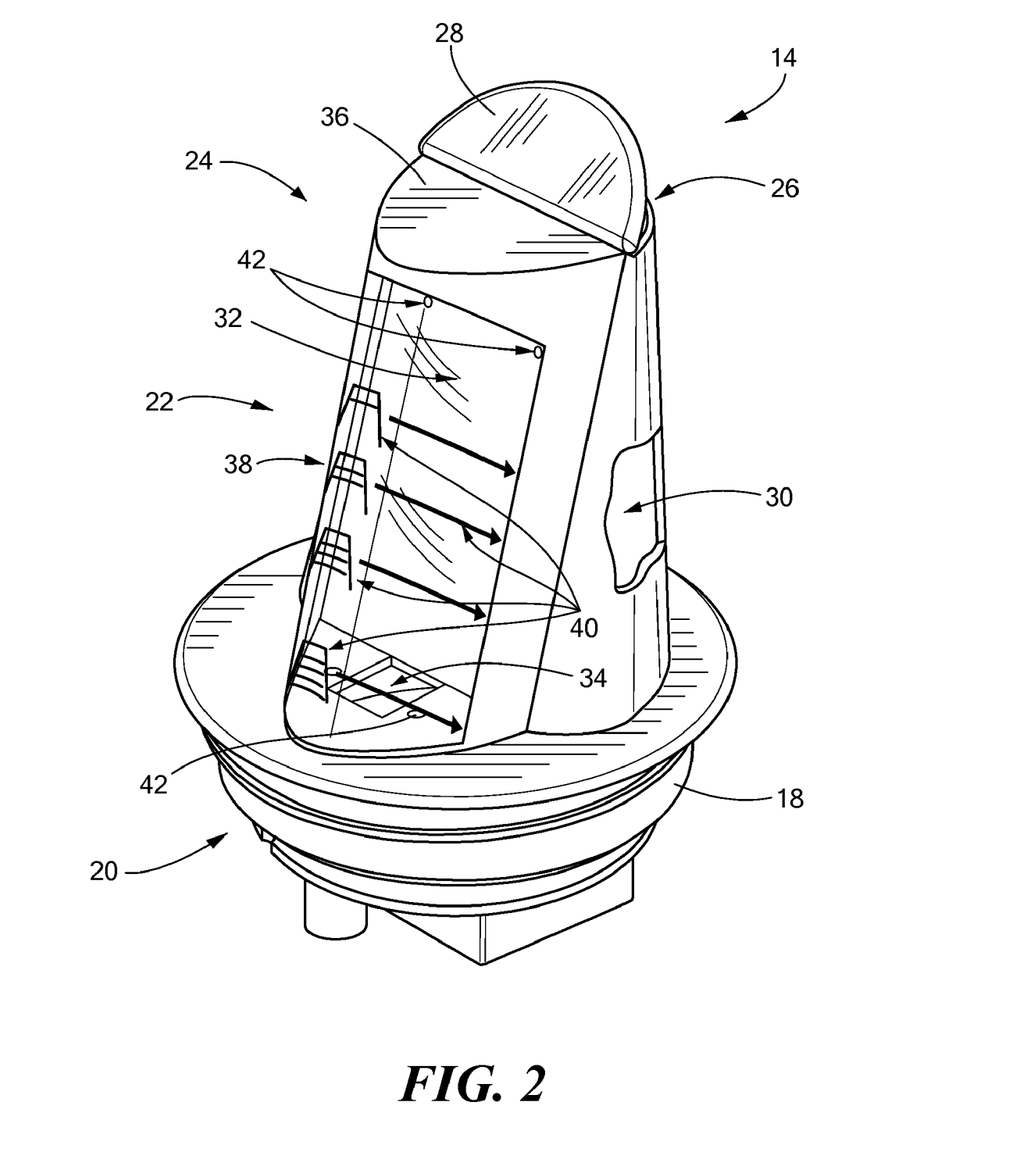
FIG. 2 schematically shows a perspective, partially cut away view of a spout shown in FIG. 1 and configured in accordance with illustrative embodiments of the invention.

FIG. 2 shows a partially cut away, perspective view of the spout 14 shown in FIG. 1. In particular, the spout 14 has a bottom portion 20 that screws onto the neck 16 of the container 12, a main body 22 for both identifying fluid volumes and permitting fluid to flow therethrough, and a top portion 24 that forms a fluid outlet 26. All portions illustratively are formed from plastic by conventional injection molding processes.

The top portion 24 also includes a cap 28 formed as living hinge that provides a snap-fit closure for the fluid outlet 26. Accordingly, prior to pouring fluid through the spout 14, a user pivots the cap 28 rearwardly to open the fluid outlet 26. A corresponding manner, after pouring fluid through the spout 14, the user may pivot the cap 28 back toward the fluid outlet 26 to prevent inadvertent fluid leakage.

To permit fluid flow through the spout 14 and measure fluid volumes substantially simultaneously, the main body 22 respectively has a pour chamber 30 that channels fluid to the outlet 26, and an indicating chamber 32 for identifying cumulative amounts of fluid passing through the outlet 26 during a single pour. In illustrative embodiments, the indicating chamber 32 has an indicating inlet 34 at its bottom end for receiving a sample amount of fluid, and a closed opposite end 36. Accordingly, the indicating inlet 34 is the only port for permitting fluid in or out of the indicating chamber 32. It thus acts as a fluid outlet in certain instances (e.g., when turned upright after pouring fluid through the pour chamber 30). In addition, the indicating chamber 32 also has a transparent or translucent side wall 38 with visual indicia 40 identifying the approximate volume of fluid flowing through the fluid outlet 26.

As shown, the indicia 40 simply are horizontal graduations with optional identifying symbols. The indicia 40 nevertheless can include a number of other means, including different visual markings, movable parts and/or audible signals. Details of illustrative movable parts are shown in copending U.S. patent application Ser. No. 11/199,578, filed Aug. 8, 2005 and entitled, "APPARATUS AND METHOD OF DISPENSING FLUID. Audible signals can be implemented in a number of manners. For example, a microchip (not shown) may be configured both to detect fluid volumes and emit a beep for every ounce of fluid it detects. Such a microchip may be positioned in the indicating chamber 32. In some embodiments, however, the indicating chamber 32 may be eliminated by positioning the microchip within the pour chamber 30. As another example, the venting could be tuned to provide audible signals indicating fluid volumes being poured.

Figure 3:
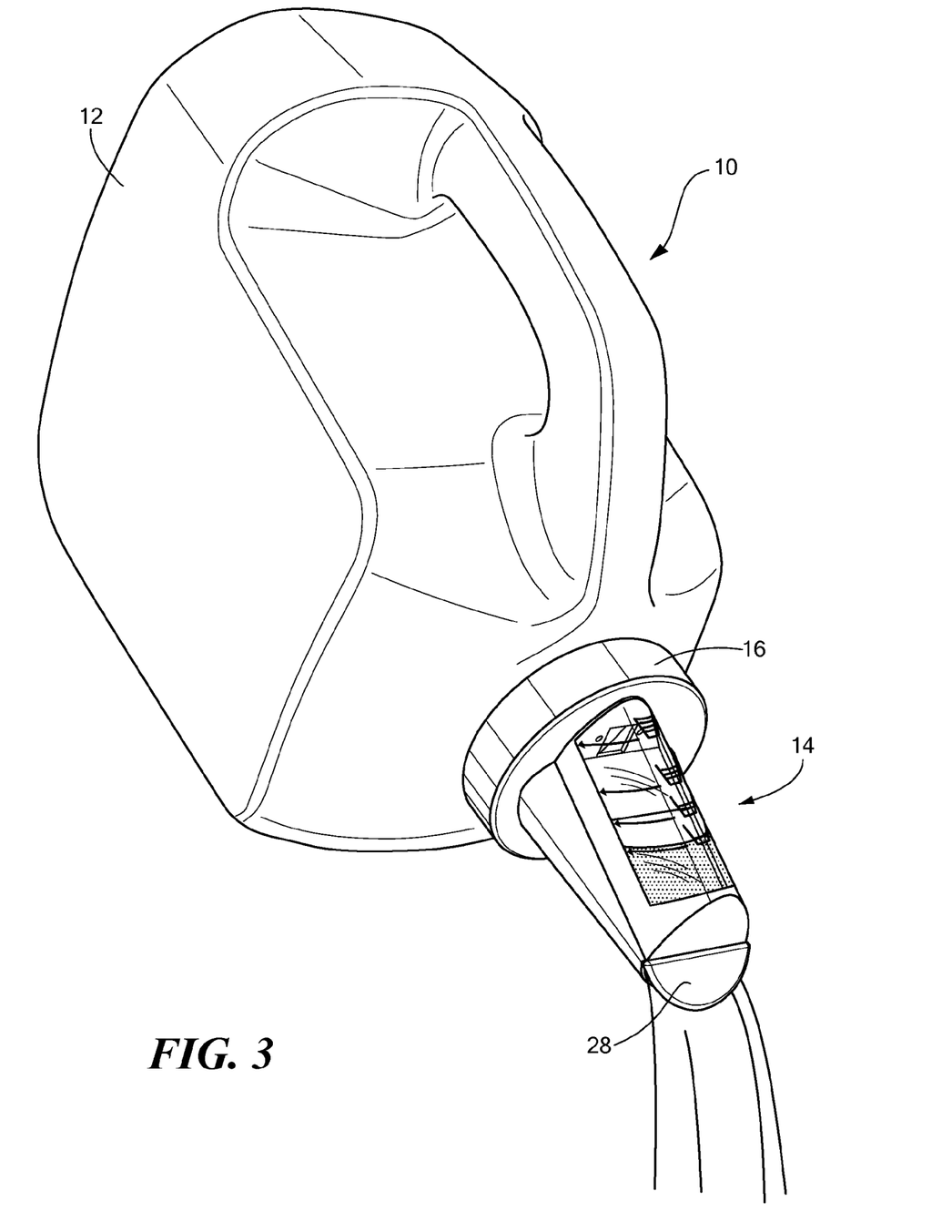
FIG. 3 schematically shows a fluid dispensing system of FIG. 1 while pouring fluid through its outlet.

When pouring (i.e., when the outlet 26 is tipped so that it faces at some angle downwardly relative to the horizontal, as shown in FIG. 3), gravity or some other force or pressure forces fluid through the pour chamber 30 and, ultimately, through the outlet 26. Fluid enters the pour chamber 30 via a pour inlet 30A. At the same time, fluid enters the indicating chamber 32 via the indicating inlet 34 and pools at the closed opposite end 36 of the indicating chamber 32. This fluid level progressively rises to show the total amount of fluid passing through the outlet 26.

By way of example, from the inverted position (i.e., when pouring), the bottom graduation (i.e., the graduation nearest the closed end 36 of the indicating chamber 32) may represent about a quarter cup of fluid (through the outlet 26), the next graduation may indicate about a half cup of fluid, the third graduation may indicate about three quarters of a cup of fluid, and the final graduation (i.e., nearest the indicating inlet 34) may indicate about a full cup. Accordingly, as discussed below, fluid is metered through the pour chamber 30 and the indicating chamber 32 in a manner that ensures the general accuracy of these readings. Of course, fluid flow may be controlled to provide graduations identifying any practical, desired level. For example, the sizes of the pour inlet 30A and the indicating inlet 34, as well as the interior geometry of the chambers, may be changed to increase or decrease fluid flow. The graduations discussed above therefore are exemplary and not intended to limit various aspects of the invention.

As shown in FIGS. 2 and 3, among others, the indicating chamber 32 also has vent holes 42 to facilitate fluid flow into and out of its interior. In illustrative embodiments, the vent holes 42 are substantially smaller than the indicating inlet 34. The material forming the vent holes 42 illustratively has hydrophobic qualities that, together with the small size of the vent holes 42, mitigate the likelihood of fluid flowing therethrough. The size of the vent holes 42 nevertheless are coordinated with the size of the indicating inlet 34, housing material, and anticipated flow properties of the fluid (e.g., surface tension and viscosity) to ensure appropriate fluid flow into and from the indicating chamber 32. The spout 14 has additional vents, discussed below, which have similar properties relative to other discussed ports.

Figure 4A:
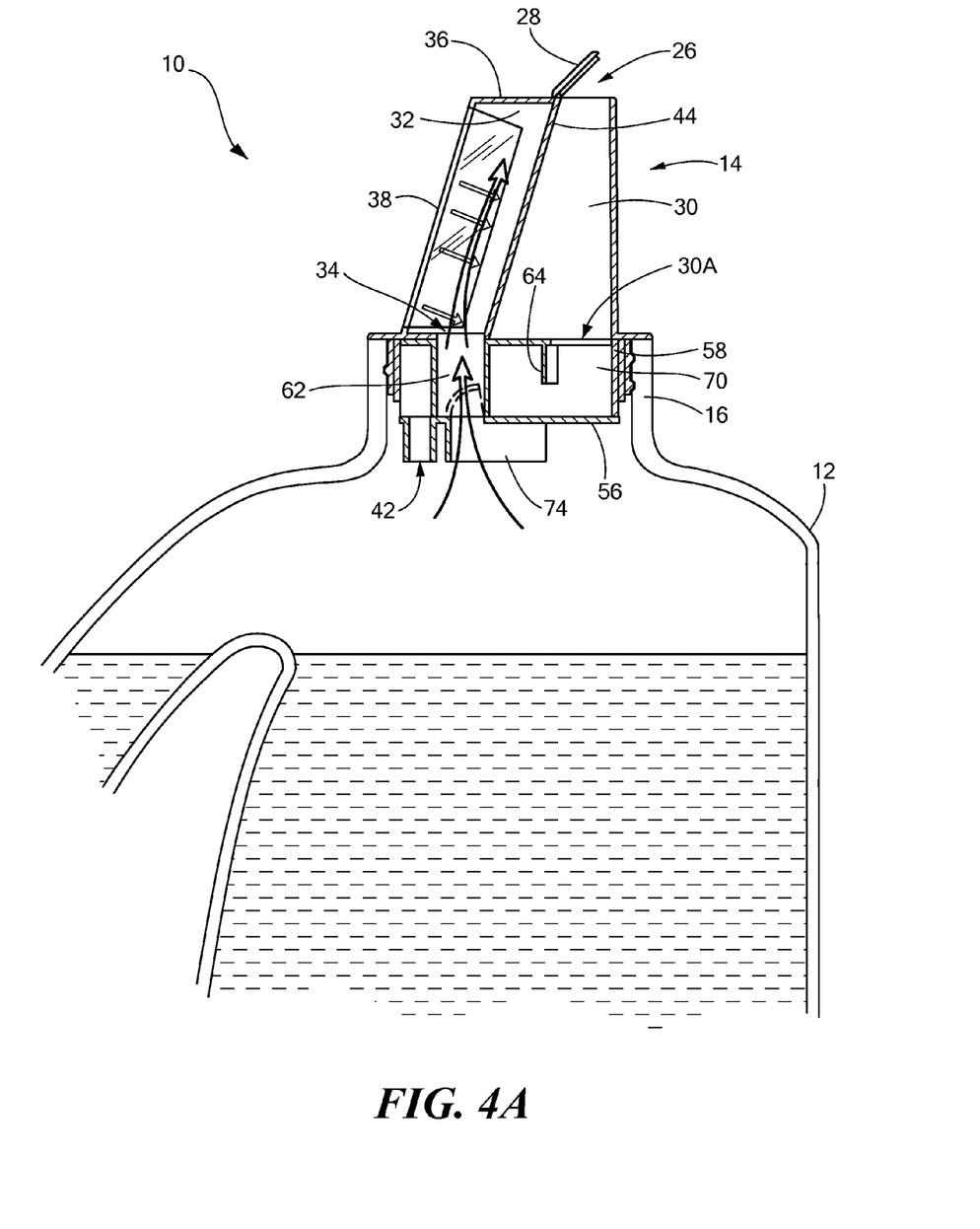
FIG. 4A shows a cross-sectional view of the fluid dispensing system shown in FIG. 1 in a rest position. This Figure is a cross-sectional view across an inlet to the indicating chamber.
Figure 4B:
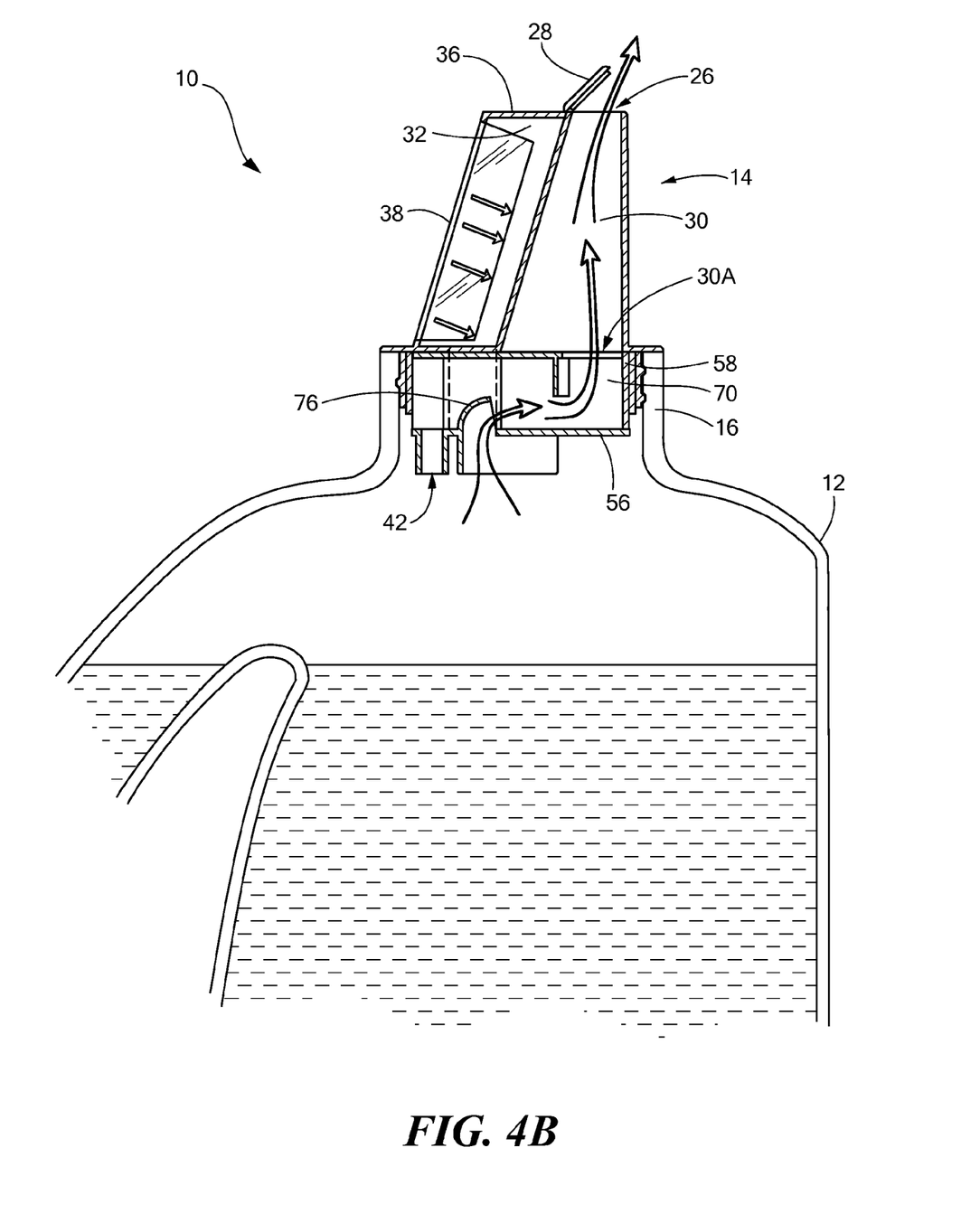
FIG. 4B also shows a cross-sectional view of the fluid dispensing system shown in FIG. 1 in a rest position. This Figure is a cross-sectional view across an inlet to the pour chamber.

FIGS. 4A and 4B schematically show cross-sectional views of the system 10 shown in FIG. 1 when upright (i.e., not pouring fluid). Specifically, FIG. 4A shows a cross-sectional view through the indicating inlet 34, while FIG. 4B shows a cross-sectional view through a fluid path leading to the pour inlet 30A. FIGS. 4A and 4B also have flow arrows showing the direction that fluid should flow when the system 10 is tilted for pouring fluid. In particular, the flow arrows in FIG. 4A show the path that fluid should take into the indicating chamber 32, while the flow arrows in FIG. 4B show the path that fluid should take into the pour chamber 30. Of course, when in the upright position, fluid does not follow the flow arrows, which are included simply for illustrative purposes. FIGS. 4A and 4B clearly show a number of the internal components, including the pour chamber 30, indicating chamber 32, and a dividing wall 44 between the two chambers. Various of these details are discussed below with regard to FIGS. 6, 7, 8A, and 8B (discussed below).

Figure 5A:
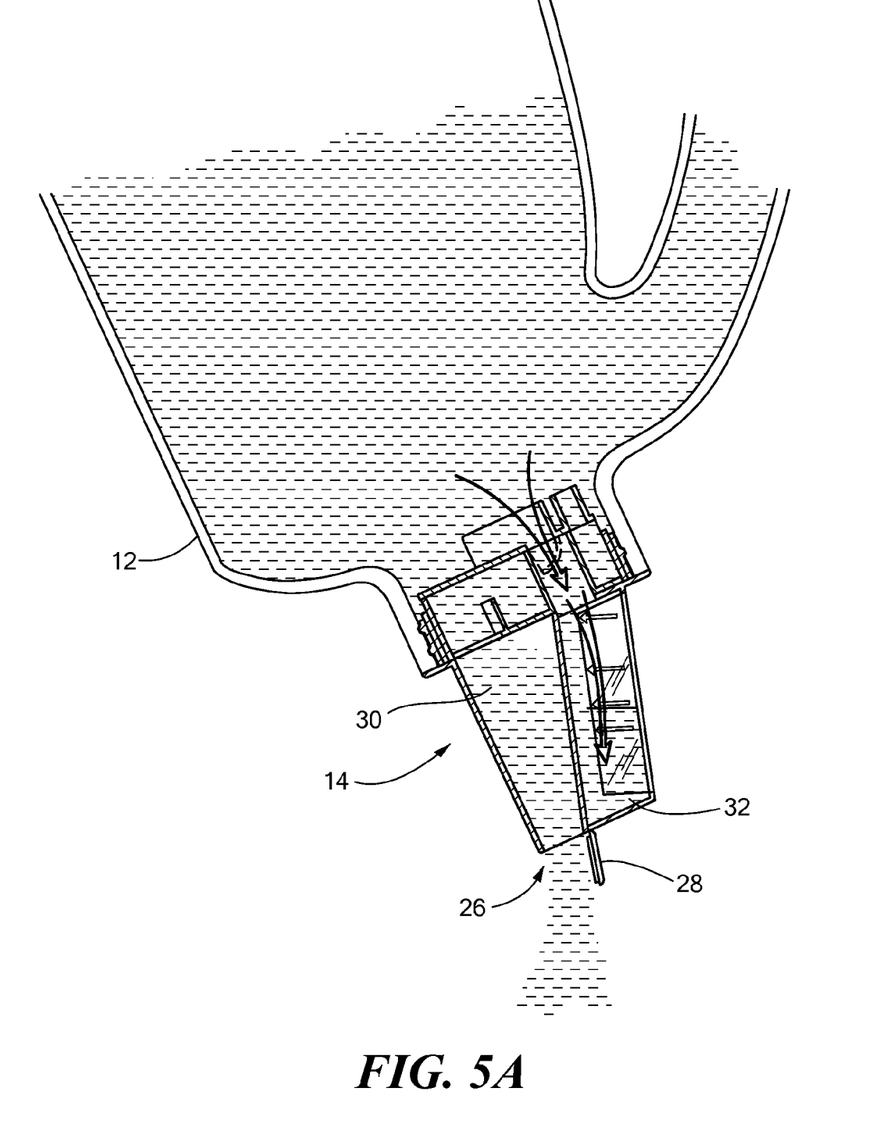
FIG. 5A shows the cross-sectional view of FIG. 4A while pouring fluid through its spout.
Figure 5B:
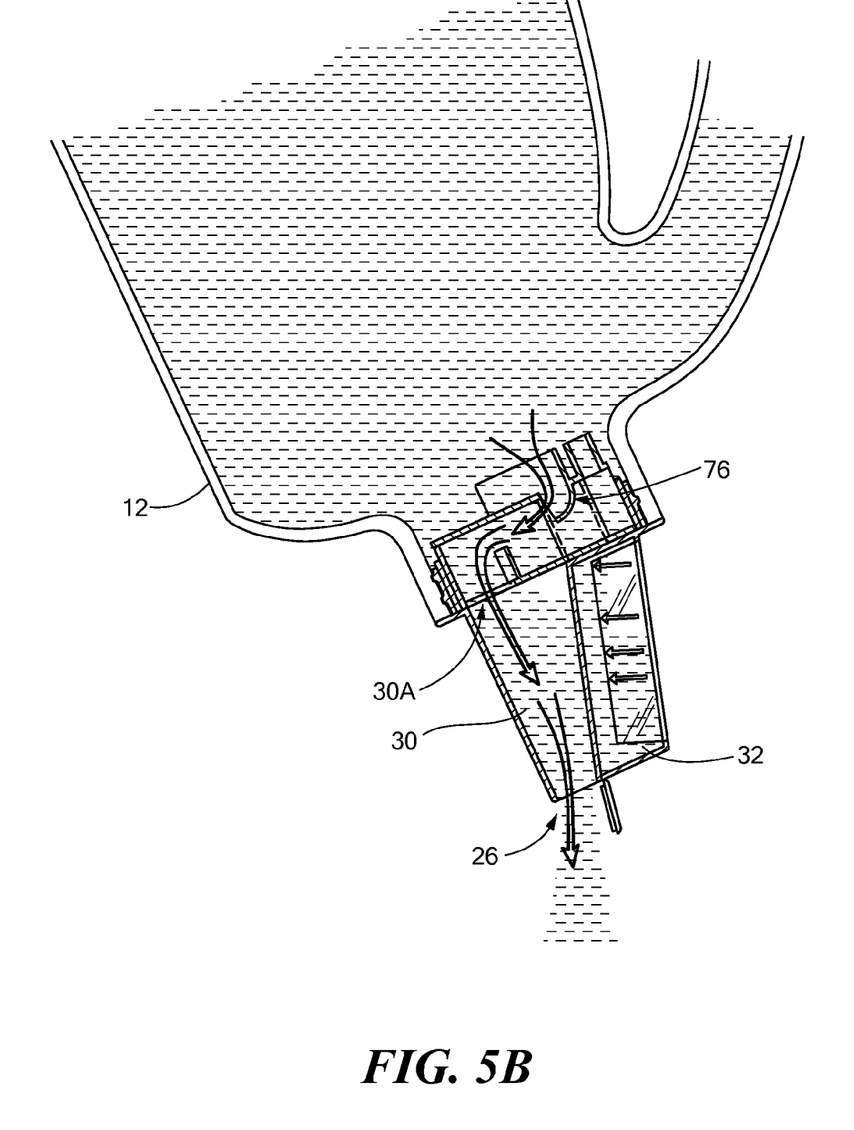
FIG. 5B shows the cross-sectional view of FIG. 4B while pouring fluid through its spout.

FIGS. 5A and 5B respectively show the views of FIGS. 4A and 4B while pouring fluid (corresponding to FIG. 3). As shown in FIGS. 5A and 5B, fluid follows the paths delineated by the flow arrows of FIGS. 4A and 4B.

Figure 6:
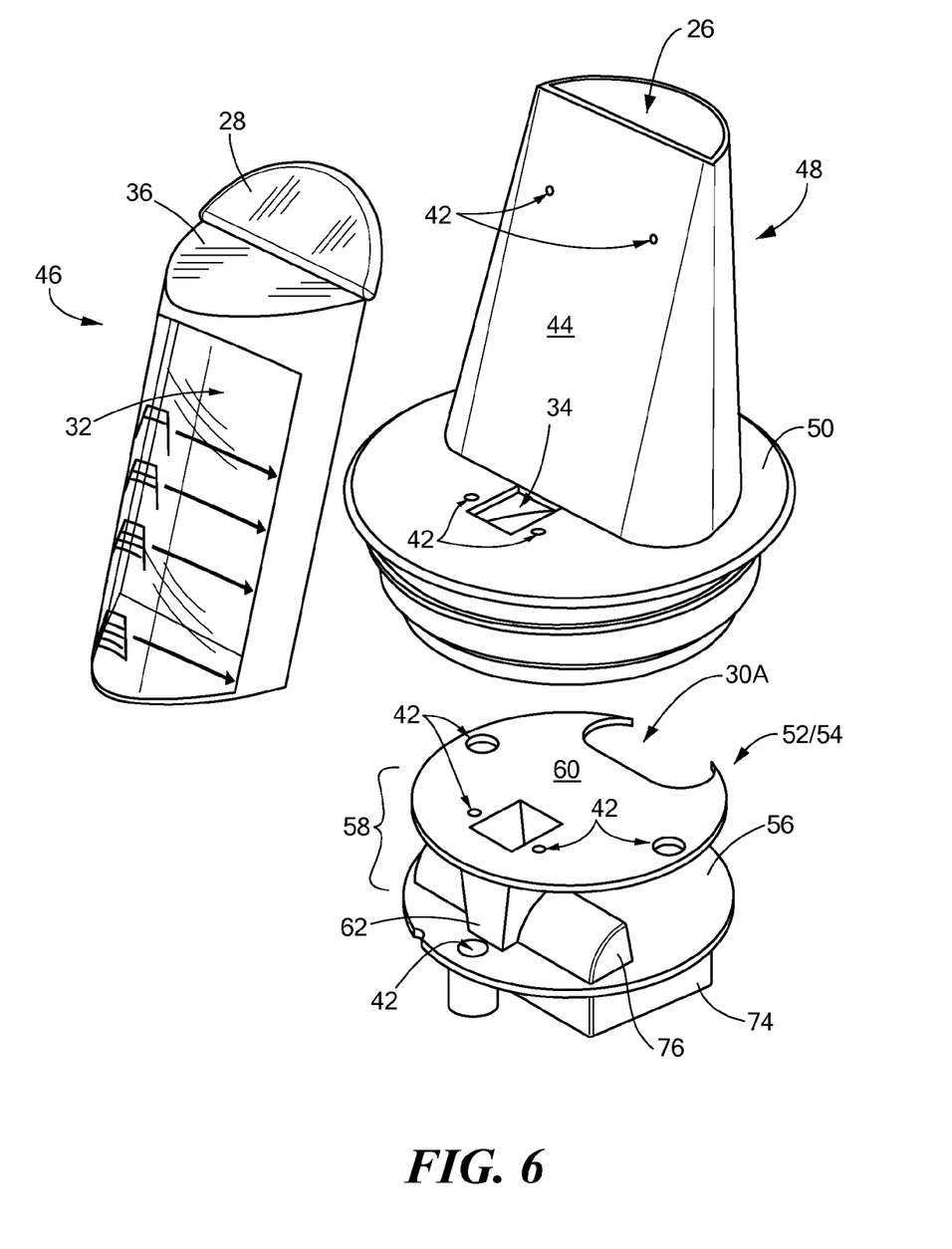
FIG. 6 schematically shows an exploded view of the spout shown in FIG. 2.

The spout 14 may be produced in accordance with conventional processes. For example, as shown in FIG. 6, the spout 14 may be considered to be formed by coupled first, second, and third separately moldable pieces. In particular, as shown in FIG. 6, the first piece 46 has the indicating chamber 32 and cap 28, while the second piece 48 has the pour chamber 30 extending upwardly from a base portion 50, and threads 18 extending downwardly from the base portion 50. The third piece 52 has a flow control apparatus 54, which comprises a vented lid 56 and a fluid handler 58 for directing fluid within the spout 14. The three pieces 46, 48, and 52 may be coupled in a conventional manner, such as by one or more of an adhesive or ultrasonic welding process. In some embodiments, however, rather than be a part of the second piece, the threads 18 may be formed as part of the third piece 52.

Figure 7:
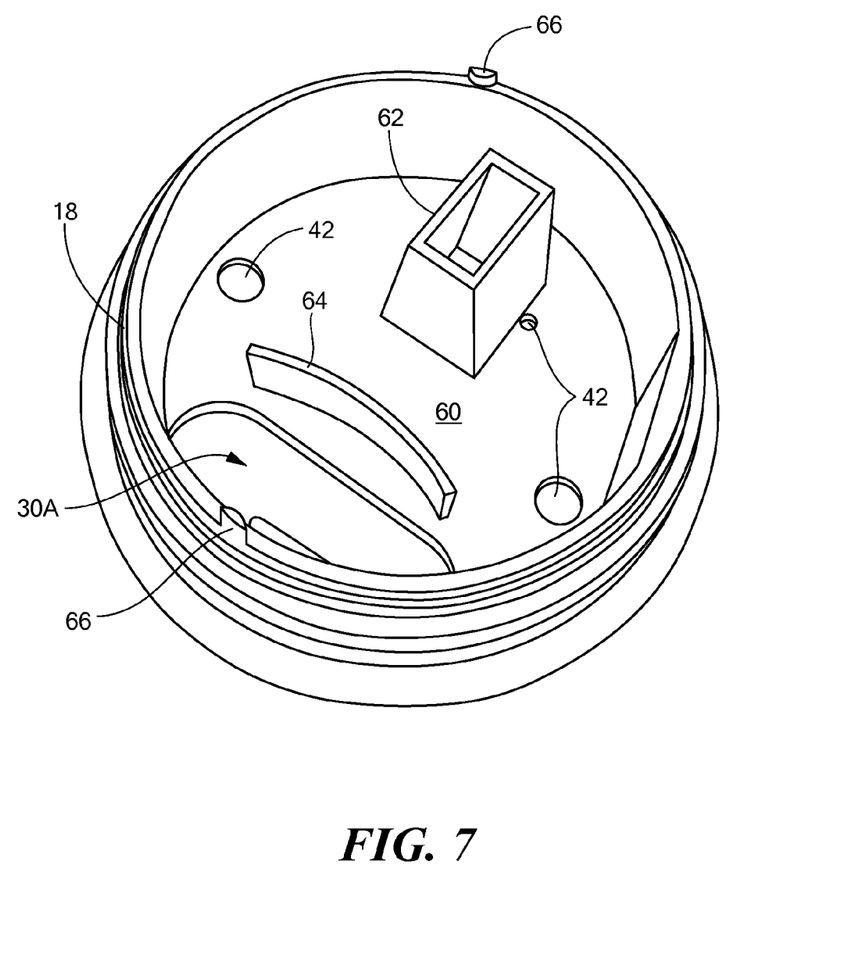
FIG. 7 schematically shows a bottom view of the spout shown in FIG. 2 with its covering lid removed.
Figure 8A:
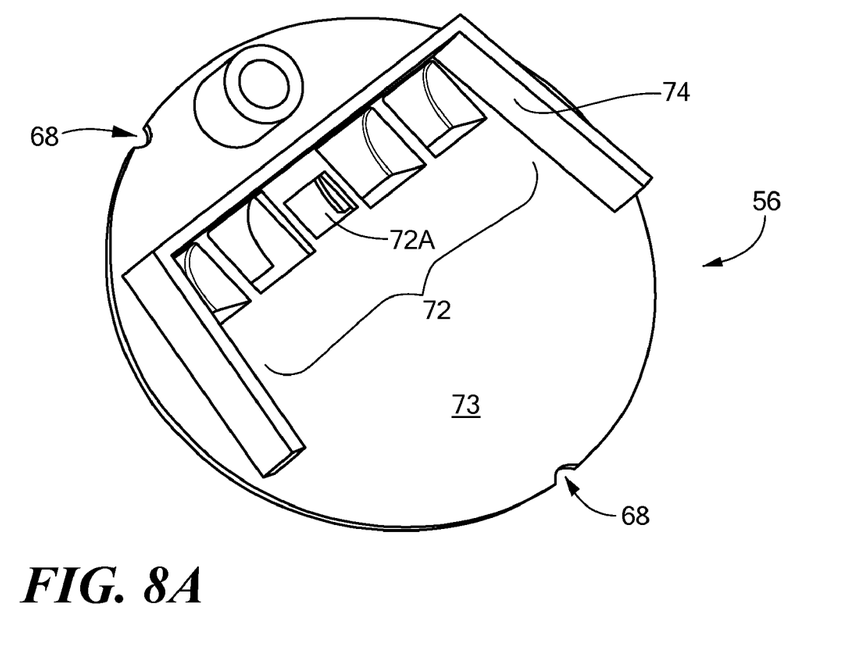
FIGS. 8A and 8B schematically show interior and exterior sides of a covering lid, which is part of the spout shown in FIG. 2.
Figure 8B:
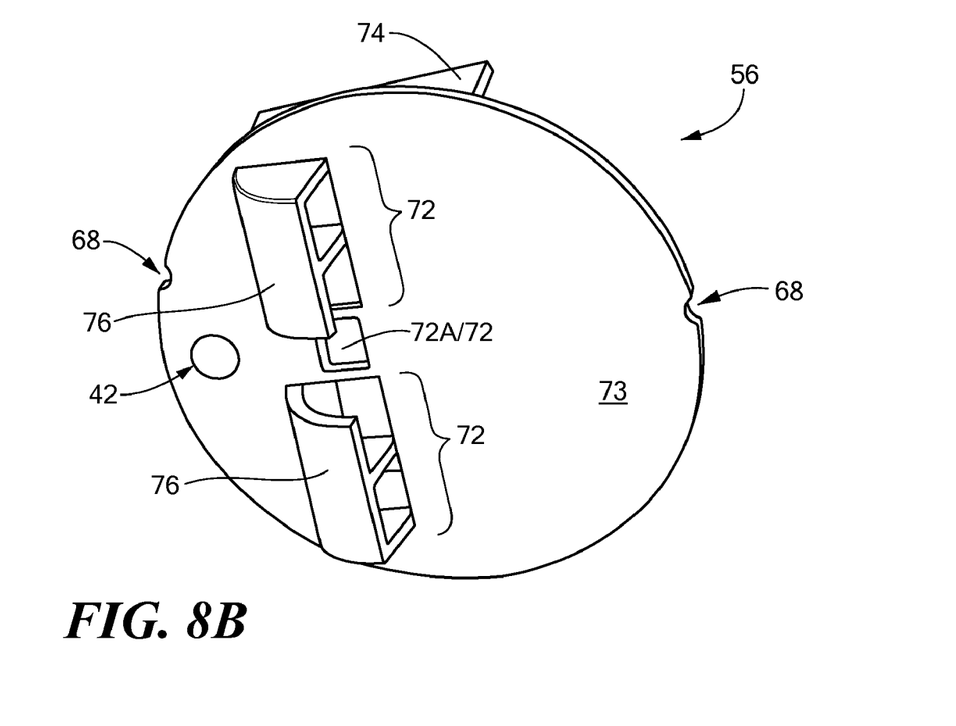

FIGS. 7, 8A, and 8B show additional details of the third piece 52. In particular, FIG. 7 shows a bottom view of the fluid handler 58 uncoupled from the vented lid 56 (shown in FIGS. 8A and 8B). This embodiment shown in FIG. 7 also includes the threads 18. The fluid handler 58 includes a number of integral components that cooperate with the vented lid 56 to direct fluid either to the indicating chamber 32 or the pour chamber 30 in a controlled manner. Specifically, the fluid handler 58 includes a flat surface 60 forming an inlet channel 62 leading to the indicating chamber 32, and the above discussed pour inlet 30A.

To ensure that fluid enters the pour inlet 30A in a controlled manner, the fluid handler 58 also includes a fluid redirector 64 extending from the flat surface 60. The fluid handler 58 illustratively is a large diameter, curved, concave wall from the perspective of the pour inlet 30A. Accordingly, when the system 10 is in a pouring mode, the convex surface of the fluid redirector 64 reduces the speed at which a fluid enters the pour inlet 30A. Consequently, fluid flow through the spout 14 should be smoother and more controlled.

The fluid handler 58 also includes vent holes 42 for the indicating chamber 32 and the pour chamber 30, as well as positioners 66 that facilitate attachment of the vented lid 56 to the fluid handler 58. The vented lid 56 therefore has indents 68 along its rim (see FIGS. 8A and 8B, discussed below) corresponding to the locations of the positioners 66.

FIGS. 8A and 8B respectively show exterior and interior views of the vented lid 56. When assembled, the interior side of the vented lid 56 and fluid handler 58 are considered to form an interior chamber 70 (see FIG. 4A) that leads to the pour inlet 30A of the pour chamber 30. Accordingly, as shown in FIG. 8A, the vented lid 56 may be considered to have a base 73 with five aligned fluid openings 72, and a vent hole 42 for venting the interior chamber 70. The center fluid opening (shown as 72A) is in intimate contact with and leads directly to the inlet channel 62 of the fluid handler 58 (i.e., leading to the indicating chamber 32), while the other openings generally lead to the interior chamber 70. During use, fluid flows from the exterior side of the vented lid 56, through the five fluid openings 72, and into either the indicating chamber 32 or the interior chamber 70. Fluid in the interior chamber 70 ultimately leads to the pour inlet 30A.

The vented lid 56 also includes a flange 74 extending partially about the five fluid openings 72. For example, as shown in FIG. 8A, the flange 74 extends approximately around three sides of the fluid openings 72. The flange 74 has a number of benefits, including having the effect of pooling fluid in the area of the fluid openings 72. By pooling fluid in this manner, fluid should flow through the outlet 26 in a more continuous manner.

FIG. 8B shows the interior side of the vented lid 56, which includes a pair of fluid guides 76 that extend inwardly of the base 73. In illustrative embodiments, each fluid guide 76 has a concave interior surface that redirects incoming fluid from the fluid openings 72 into the interior chamber 70 in a direction that is not substantially normal to the surface of the base 73. Stated another way, fluid exiting the terminal end of one of the fluid guides 76 should not be traveling in a direction that is normal to the base 73. Of course, is expected that fluid may be traveling substantially normal to the base 73 shortly after it exits the fluid guides 76. Among other benefits, the fluid guides 76 should have the effect of decreasing fluid flow rates, thus providing a smoother and more constant flow of fluid through the spout 14 in many anticipated instances.

The size, number, and geometry of the various discussed vented lid components are carefully controlled to ensure pre-specified flow rates through the spout 14. For example, the vented lid 56 could have smaller fluid openings 72 or fewer fluid openings 72 to provide slower fluid flow rates through the spout 14. Accordingly, discussion of specific geometries and numbers, such as five substantially rectangular fluid openings 72, or the geometry of the flange 74, is for illustrative purposes only and not intended to limit all embodiments of the invention.

To dispense fluid, a user therefore may tilt the container 12 to an angle that causes fluid to pass through the spout 14 (see FIG. 3). The user may continue to pour the fluid until the indicating chamber 32 shows that a desired amount of fluid has been dispensed. At that point, the user may orient the system 10 in an upright manner (see FIG. 1) for storage. The user therefore does not need additional cups to measure the fluid. In addition, the user also does not need to remove the spout 14 from the container 12. Instead, the user simply pours fluid in one step.

Accordingly, the indicating chamber 32 may be considered to "sample" a portion of fluid flowing into the spout 14. Because of the geometry and makeup of the spout 14, this portion of fluid should be substantially proportional to the amount of fluid flowing through the spout outlet 26. This portion of fluid entering the spout 14 thus cooperates with the visual indicia 40 to show approximate fluid volumes the system 10 dispenses. Moreover, different spout geometries can be used for different types of fluids having different flow characteristics. Empirical testing should suffice to pre-determine the proportion of sampled fluid in the indicating chamber 32.

In a manner similar to many other fluid measurement devices, the accuracy of fluid readings may have an error factor. Accordingly, fluid readings should be considered an approximation and not necessarily an exact amount. For example, a reading of 0.5 cups could indicate that the spout 14 dispensed 10% more or 10% less than 0.5 cups of fluid. Testing has determined that fluid readings often are less accurate when the container 12 is almost empty or completely full. In controlled laboratory conditions, accuracy is enhanced, therefore mitigating the error factor. It nevertheless is anticipated that during use, human error will contribute to the error factor.

Although the above discussion discloses various exemplary embodiments of the invention, it should be apparent that those skilled in the art can make various modifications that will achieve some of the advantages of the invention without departing from the true scope of the invention.

What is claimed is:

1. An apparatus for dispensing fluid from a container and for indicating a quantity of the fluid dispensed through the apparatus, the apparatus comprising:
   a first housing forming a pour chamber having a pour inlet for receiving fluid from the container, the pour chamber also having an outlet in fluid communication with the pour inlet, such that the received fluid can flow through the pour chamber and exit through the outlet,
   the first housing having an indicating apparatus comprising an indicating chamber with an indicating inlet for receiving a quantity of fluid into the indicating chamber, wherein the indicating inlet and the pour inlet are sized such that a rate at which fluid flows through the indicating inlet is related to the rate at which fluid flows through the pour chamber, and such that the quantity of fluid received into the indicating chamber relates in real time to the quantity of fluid that has thus far exited through the outlet,
   the first housing having a wall separating the indicating chamber from the pour chamber,
   the indicating apparatus having indicia identifying an approximate quantity of the fluid that has been dispensed through the pour chamber.

2. The apparatus as defined by claim 1 wherein the indicating chamber includes a substantially translucent or transparent wall having graduations that form at least part of the indicia.

3. The apparatus as defined by claim 1 further comprising a second housing for containing fluid, the first housing being removably couplable with the second housing.

4. The apparatus as defined by claim 3 wherein the first housing and second housing are couplable by means of a threaded connection.

5. The apparatus as defined by claim 1 further comprising a flange extending about at least a portion of at least one of the pour inlet and the indicating inlet.

6. The apparatus as defined by claim 1 further comprising a fluid guide extending inwardly of the pour inlet relative to the first housing.

7. The apparatus as defined by claim 1 wherein the pour chamber includes an outlet chamber that extends to the outlet, the apparatus further comprising a fluid redirector between the pour inlet and the outlet chamber.

8. The apparatus as defined by claim 1 wherein the first housing includes a hydrophobic material and a vent formed through the hydrophobic material.

9. The apparatus as defined by claim 8 wherein the vent is formed in one of the indicating chamber and the pour chamber.

10. The apparatus as defined by claim 8 wherein the indicating chamber is closed to the exterior of the first housing.

11. The apparatus as defined by claim 1 wherein the pour inlet and the indicating inlet are open to a common volume.

12. A spout for dispensing fluid and for indicating a quantity of the fluid dispensed through the spout, the spout comprising:
a pour chamber with a pour inlet and a pour outlet in fluid communication with the pour inlet; and
an indicating chamber having an indicating inlet, the indicating inlet and the pour inlet being in a substantially parallel configuration to receive fluid from a common volume in parallel, the indicating inlet being configured such that the quantity of the fluid received into the indicating chamber is related to the quantity of the fluid dispensed through the pour outlet, the indicating chamber having a substantially transparent or translucent wall with visual indicia indicating the volume of fluid that has been dispensed through the pour outlet.

13. The spout as defined by claim 12 further including user-actuatable means for controlling fluid flow through the pour outlet.

14. The spout as defined by claim 12 further comprising means for removably coupling with a container.

15. The spout as defined by claim 12 further comprising a flange extending about at least a portion of at least one of the pour inlet and the indicating inlet.

16. The spout as defined by claim 12 further comprising a fluid guide extending inwardly of the pour inlet.

17. The spout as defined by claim 12 wherein the spout further comprises a hydrophobic material and a vent formed through the hydrophobic material.

18. The spout as defined by claim 12 wherein the indicating chamber is closed to the exterior of the spout.

19. A method of producing an apparatus for dispensing fluid from a container, the method comprising:
forming a spout having a pour chamber, the pour chamber having:
a pour inlet configured to admit fluid from the container; and
a pour outlet in fluid communication with the pour inlet, such that the fluid admitted by the pour inlet is dispensed through the pour outlet;
forming an indicating chamber within the spout, the indicating chamber having a metered indicating inlet configured to admit a quantity of fluid into the indicating chamber, wherein the quantity of fluid admitted into the indicating chamber is related to the quantity of fluid dispensed through the pour outlet;
determining an approximate rate that the indicating chamber fills as a function of a rate that fluid flows from the pour outlet; and
adding indicia to the indicating chamber to indicate, in real time, an approximate quantity of the fluid that has been dispensed through the pour outlet.

20. The method as defined by claim 19 wherein forming the indicating chamber includes forming a wall that is at least one of substantially translucent and substantially transparent and that bounds the indicating chamber, and wherein adding indicia includes adding indicia to the wall.

21. The method as defined by claim 19 further comprising forming a flange about at least a portion of the pour inlet and the indicating inlet.

22. The method as defined by claim 19 further comprising forming a fluid guide extending inwardly of the pour inlet.

23. The method as defined by claim 19 wherein the spout comprises a hydrophobic material, the method comprising forming a vent through the hydrophobic material.

24. A method of pouring a fluid from a container having a spout with a fluid outlet, the method comprising:
tilting the container to at least one angle that causes fluid to enter the spout, thereby causing a volume of the fluid to be dispensed through the fluid outlet of the spout;
capturing, via a metered indicating inlet, a portion of the fluid entering the spout, such that the captured portion of the fluid has a volume having a predetermined relationship to the volume of fluid dispensed through the fluid outlet; and
causing the captured portion of the fluid to produce a real-time visual indication of an approximation of the volume of the fluid that has been dispensed through the fluid outlet.

25. The method as defined by claim 24 wherein the spout has visual indicia identifying an approximate volume of the fluid that has been dispensed through the fluid outlet, the visual indicia being on a substantially transparent portion of the spout.

26. The method as defined by claim 24 wherein capturing includes diverting the captured portion of the of fluid into an indicating chamber that is closed to the exterior of the spout.

27. The method as defined by claim 26 wherein the indicating chamber has at least one vent configured to permit air to flow to and from the indicating chamber.

28. The method as defined by claim 24 wherein at least one of the spout and the container includes a plurality of fluid ports for receiving fluid contained by the container, the plurality of ports being in at least one of an area of the spout and a portion of the container, the method comprising partially obstructing fluid flow around at least a portion of the plurality of fluid ports to concentrate fluid to a portion of the area around the ports after tilting.

29. The method as defined by claim 24 wherein at least one of the spout and the container includes a plurality of fluid ports configured to receive fluid contained by the container, the method further comprising partially obstructing fluid flow through at least one of the plurality of fluid ports.

30. The method as defined by claim 24 wherein tilting includes tilting the container to an angle between about zero degrees and about ninety degrees relative to vertical.

31. A spout for indicating a quantity of fluid dispensed from a container, the spout comprising:
a pour chamber having:
a pour inlet for admitting fluid from the container; and
a pour outlet in fluid communication with the pour inlet, such that the fluid admitted by the pour inlet is dispensed through the pour outlet; and
an indicating chamber having:
a metered indicating inlet for admitting volume of fluid into the indicating chamber, such that the volume of fluid admitted into the indicating chamber is determined according to a predetermined relationship to the volume of the fluid dispensed through the pour outlet; and
indicia adapted to indicate, in real time, an approximation of the volume of the fluid that has been dispensed through the pour outlet.

32. A spout as defined in claim 31 wherein the metered indicating inlet is configured to admit the quantity of fluid into the indicating chamber based on a rate of fluid flow through the pour outlet.

33. A spout as defined in claim 31 further comprising user-actuatable means for controlling fluid flow through the pour outlet.

34. A spout as defined in claim 31 wherein the indicating chamber is in fluid communication with the interior of the container and otherwise closed to the exterior of the spout.

35. A spout as defined in claim 31, further comprising a wall separating the indicating chamber from the pour chamber.

36. A spout as defined in claim 31, further comprising a fluid guide extending inwardly of the pour inlet relative to the pour chamber.

37. A spout as defined in claim 31, wherein the pour chamber includes an outlet chamber that extends to the pour outlet, the spout further comprising a fluid redirector between the pour inlet and the outlet chamber.

38. A spout as defined in claim 31, the spout defining a vent between the container and at least one of the pour chamber and the indicating chamber.

\* \* \* \* \*

UNITED STATES PATENT AND TRADEMARK OFFICE
CERTIFICATE OF CORRECTION

| | | |
|---|---|---|
| PATENT NO. | : 7,845,524 B2 | Page 1 of 1 |
| APPLICATION NO. | : 11/199587 | |
| DATED | : December 7, 2010 | |
| INVENTOR(S) | : Christopher T. Evans et al. | |

It is certified that error appears in the above-identified patent and that said Letters Patent is hereby corrected as shown below:

In Col. 10, line 24
replace "of the of fluid into an"
with "of the fluid into an"

Signed and Sealed this
Eighth Day of February, 2011

David J. Kappos
*Director of the United States Patent and Trademark Office*